Patented Feb. 23, 1937

2,071,822

UNITED STATES PATENT OFFICE 2,071,822

FABRICATED VEGETABLE FIBROUS MATERIAL AND METHOD OF MAKING THE SAME

George H. Ellis, New Brighton, Minn., assignor to The Insulite Company, Minneapolis, Minn., a corporation of Minnesota No Drawing. Application February 17, 1936, Serial No. 64,376

10 Claims. (Cl. 92—21)

This invention relates to a fungi and insect toxic fabricated vegetable fiber material and the method of making.

Fabricated vegetable material may be of any form or type and may be made of many different varieties of vegetable fibers. One of the most common forms of fabricated vegetable materials is the wall board.

In manufacturing fabricated vegetable fiber material, there is mixed therewith a group of substances which cooperate to protect it against both decay and insects, such as termites, and render it highly resistant to moisture.

An object of the invention is the manufacture of felted vegetable fiber products that have no objectionable odor and that can be made in a relatively inexpensive manner whereby the products will have a superior biological resistance.

A further object of the invention is the production of a rot-proof, insect repellant and water-resisting product by a single treatment.

This invention comprehends the use of material or materials having toxic properties that are non-poisonous to human beings and that are devoid of objectionable odor and/or color.

It is preferred that tetrachlorophenate be used as the toxic agent but various other materials have been found to be satisfactory. Among the materials that have given satisfactory results are:

| Chemical | Inhibiting concentration percent |
| --- | --- |
| 2,4-dichlorophenol | 0.006. |
| Sodium 2,4-dichlorophenolate | 0.007. |
| 2,5-dichlorophenol | 0.004. |
| Sodium 2,5-dichlorophenolate | 0.007. |
| 2,4,5-trichlorophenol | 0.001. |
| Sodium 2,4,5-trichlorophenolate | 0.001. |
| Sodium 2,4,6-trichlorophenolate | 0.004. |
| 2,3,4,6-tetrachlorophenol | 0.004 plus or minus. |
| Sodium 2,3,4,6-tetrachlorophenolate | 0.001. |
| Pentrachlorophenol | 0.004 plus or minus. |

A toxic containing material having the properties of rendering vegetable fiber material insect and fungi toxic is incorporated in the product to be protected. For the purpose of this application it has been elected to set forth certain methods of applying the toxic material to wood or woody substance but it is to be understood that they are set forth for illustrative purposes only, and are not to be accorded any interpretation such as might have the effect of limiting what is claimed as the invention short of its true and comprehensive scope in the art.

In the general practice of manufacturing fibrous products, such as wall board, building board and insulating board, the fibers are suspended in water in the proportion of 1½ parts of fiber to 98½ parts of water. The percentages may be varied in the range of 4 parts of fiber to 96 parts of water. The toxic agent prepared as hereinafter described is well adapted to be used in fungi, insect and water-proofing manufactured fibrous products. It is contemplated to treat various products during or prior to formation into eventual production, whereby the treatment is equally effective throughout the entire body. It is also contemplated that the treatment may be applied to any product subject to attack by insects.

It has been found that zinc tetrachlorophenate when used in combination with a sizing material renders fiber composition insulating board and the like, rot and termite proof and greatly reduces the tendency of such material to absorb moisture.

It has been discovered that by adding zinc chloride to a solution of tetrachlorophenate that the tetrachlorophenate is rendered insoluble in water and produces a jelly-like mass which is very difficult to spread over vegetable fibers during the manufacture of fibrous materials.

To overcome this difficulty and to reduce the quantity of zinc tetrachlorophenate which has been found necessary to termite and rot-proof vegetable fiber insulation board and the like, it has been discovered that by dissolving a sizing material such as wood rosin soap in water to a concentration point of approximately 4% solids, and tetrachlorophenate dissolved in water to approximate 4% of solids, and then mixing the sizing material with the solution of tetrachlorophenate. The proportions that have produced satisfactory results are 10 parts of sizing material and 4.9 parts of tetrachlorophenate. By adding the solution above referred to to vegetable fiber pulp so that the pulp will contain 1.48% of sizing material and .75% of tetrachlorophenate based on the dry weight of the vegetable fiber material and thereafter thoroughly mixing these materials with the fibrous material until the fibers are thoroughly coated. Zinc chloride is then dissolved in water to a suitable concentration, preferably about 2% solids, and added to the pulp in amount of about 0.25%, then thoroughly mixing the zinc chloride with the pulp or fibrous material and thereafter adding a precipitant to obtain a pH of approximately 5.4. The precipitant may be any that is desired, and alum or ferric chloride have been found to be the most economical to use.

The sizing material used and the tetrachlorophenate are both alkaline and mix together readily, and they have the properties of spreading thinly over a large surface. This enables all the fibers to be readily coated with a solution of the toxic material. The zinc chloride is added to set the tetrachlorophenate on the fibers and renders the toxic material insoluble. The alum is then added to precipitate the sizing material. The result is that the fiber composition board or product is rendered resistant to water and extremely insect and rot resisting.

Specifically by way of example:

1. Dissolve 10# of wood rosin soap in water to a dilution of 4% solids.
2. Dissolve 4.9# of tetrachlorophenate in water to a dilution of 4% solids.
3. Dissolve 1.6# of zinc chloride in water to a dilution of approximately 2% solid.
4. Dissolve alum in water to a saturated solution.
5. Mix the solutions 1 and 2 and add to vegetable fiber material in a water bath so that a 1,000 square foot of ½ inch material will contain 10# of rosin size and 4.9# of tetrachlorophenate, or about 1.48% of rosin size and about ¾% of tetrachlorophenate, based upon the dry weight of the vegetable fibers.

Solution 5 is thoroughly mixed with the vegetable pulp and then solution 3 is added to obtain about 1.6# of zinc chloride or about ¼% of zinc chloride, based on the dry weight of the fibers. After thoroughly mixing the fibers containing the solutions 3 and 5, there is added a sufficient amount of 4 or other precipitant to obtain a pH within the range of 4.8 to 5.8.

The best results are obtained by using 1 part of tetrachlorophenate or its equivalent to .3 part of zinc chloride. To obtain the best results the zinc chloride may vary with the range of .2 part to .4 part to one part of the toxic material. The amount of zinc in other words, should be varied according to the alkalinity of the toxic material.

Broadly, the invention comprehends the production of vegetable fiber products that are rendered insect and fungi toxic and resistant to water in a rapid and economical manner. It is desired that the product so produced shall not have any objectionable odor and/or color. It will be obvious to those skilled in the art that many variations of steps and combinations of steps constituting the process and the product produced may be made which falls in the scope of the invention without departing from the spirit thereof.

The term precipitant as used therein is intended to cover any material which will precipitate the sizing material used in the process. The term toxic material as used herein, is intended to cover any toxic material having inhibiting concentration within the range of .001 to .007. Any suitable metal chloride may be used but the most economical results so far have been obtained by using zinc chloride.

What I claim is:

1. The method of manufacturing water-resisting insect and fungi toxic fabricated wood or woody fibers, which includes the steps of mixing water soluble tetrachlorophenolate and a sizing material, adding the mixture to fibers in a water bath, adding zinc chloride only in an amount to insolublize the tetrachlorophenate, and thereafter adding a material of the class of alum to obtain a pH within the range of 4.8 to 5.8.

2. The method of making vegetable fiber products which comprises commingling water soluble tetrachlorophenolate and rosin with fibers in a water bath, adding zinc chloride within the range .2 to .4 to one part of tetrachlorophenolate, adding alum to obtain a pH within the range of 4.8 to 5.8, and then forming the article.

3. The method of manufacturing vegetable fiber products which consists of adding to fibers in a water bath rosin size and water soluble tetrachlorophenolate, adding to the fibers while in a water bath zinc chloride, adding alum in an amount to obtain a pH of approximately 5.4, and manipulating the fibers to form a product.

4. The method of making fabricated vegetable fibrous material which comprises adding a solution containing 4.9 parts of water soluble tetrachlorophenolate, 10 parts of rosin size to fibers in a water bath, adding 1.6 parts of zinc chloride, then adding a saturated solution of alum, and then forming the fabricated fibrous material.

5. A method of making fabricated vegetable material which comprises, dissolving wood rosin in water to a dilution of approximately 4% solids, dissolving water soluble tetrachlorophenolate in water to a dilution of approximately 4% solids, mixing the solutions of rosin and tetrachlorophenate with fibers in a water bath, adding zinc chloride, adding alum, and thereafter forming the fibrous material.

6. The method of mixing with fibers from a vegetable source while the fibers are in a water bath, a mixture of sizing material and sodium 2,3,4,6-tetrachlorophenolate, thereafter adding zinc chloride, and then adding alum.

7. A fabricated vegetable material highly resistant to water, insects and fungi, comprising felted vegetable fibers carrying dispersed throughout on the fibers thereof, a reaction product of sodium 2,3,4,6-tetrachlorophenolate and zinc chloride.

8. A manufactured fiber product having distributed throughout the body thereof an insect and fungi toxic substance comprising the reaction product of water soluble tetrachlorophenolate and zinc chloride, the zinc chloride present in an amount only sufficient to insolublize the tetrachlorophenolate.

9. A method of rendering fabricated vegetable material insect and fungi toxic and water-resistant by incorporating in fibers while in a water bath, a mixture of 10 parts of rosin and 4.9 parts of water soluble chlorophenolate, .3 part of zinc chloride, and alum.

10. The method of making vegetable fiber products which includes commingling with fibers in a water bath a mixture of sizing material and a toxic agent of water soluble chloro-phenolates, adding zinc chloride only in an amount sufficient to insolublize the phenolates, and thereafter adding alum.

GEORGE H. ELLIS.